US009569879B2

(12) United States Patent
Munkberg et al.

(10) Patent No.: US 9,569,879 B2
(45) Date of Patent: Feb. 14, 2017

(54) CULLING USING LINEAR BOUNDS FOR STOCHASTIC RASTERIZATION

(75) Inventors: Carl J. Munkberg, Malmo (SE); Tomas G. Akenine-Moller, Lund (SE); Jon N. Hasselgren, Bunkeflostrand (SE)

(73) Assignee: Intel Corporation, Santa Clara, CA (US)

( * ) Notice: Subject to any disclaimer, the term of this patent is extended or adjusted under 35 U.S.C. 154(b) by 392 days.

(21) Appl. No.: 14/119,977

(22) PCT Filed: May 31, 2012

(86) PCT No.: PCT/US2012/040149
§ 371 (c)(1),
(2), (4) Date: Nov. 25, 2013

(87) PCT Pub. No.: WO2013/081668
PCT Pub. Date: Jun. 6, 2013

(65) Prior Publication Data
US 2014/0132596 A1     May 15, 2014

Related U.S. Application Data

(60) Provisional application No. 61/565,614, filed on Dec. 1, 2011.

(51) Int. Cl.
| | |
|---|---|
| *G06T 15/00* | (2011.01) |
| *G02B 27/00* | (2006.01) |
| *G06T 15/40* | (2011.01) |
| *G06T 15/50* | (2011.01) |

(52) U.S. Cl.
CPC ......... *G06T 15/005* (2013.01); *G02B 27/0075* (2013.01); *G06T 15/40* (2013.01); *G06T 15/503* (2013.01)

(58) Field of Classification Search
None
See application file for complete search history.

(56) References Cited

U.S. PATENT DOCUMENTS

| | | | |
|---|---|---|---|
| 6,426,755 B1 | 7/2002 | Deering | |
| 7,554,538 B2 | 6/2009 | Wexler | |
| 8,970,584 B1 * | 3/2015 | Aila | G06T 11/40 345/420 |

(Continued)

FOREIGN PATENT DOCUMENTS

TW     20050029060 A     9/2005

OTHER PUBLICATIONS

Search report in corresponding CN patent application No. 201280058695.8 dated Apr. 3, 2015 (2 pages) [no English translation].

(Continued)

*Primary Examiner* — Andrew G Yang
(74) *Attorney, Agent, or Firm* — Trop Pruner & Hu, P.C.

(57) ABSTRACT

We present a new culling test for rasterization of simultaneous depth of field and motion blur, which efficiently reduces the set of (x, y, u, v, t) samples that need to be coverage tested within a screen space tile. The test finds linear bounds in u, t space and v, t space respectively, using a separating line algorithm. This test is part of the foundation for an efficient 5D rasterizer that extracts coherence in both defocus and motion blur to minimize the number of visibility tests.

30 Claims, 6 Drawing Sheets

(56) References Cited

U.S. PATENT DOCUMENTS

| | | | |
|---|---|---|---|
| 9,142,043 B1* | 9/2015 | Aila | G06T 11/20 |
| 2004/0227755 A1 | 11/2004 | Sfarti | |
| 2012/0274636 A1* | 11/2012 | Akenine-Moller | G06T 17/20 |
| | | | 345/420 |
| 2012/0293515 A1* | 11/2012 | Clarberg | G06T 15/10 |
| | | | 345/441 |

OTHER PUBLICATIONS

Chinese office action in corresponding CN patent application No. 201280058695.8 dated Apr. 3, 2013 (4 pages) [no English translation].

PCT International Search Report and Written Opinion issued in corresponding PCT/US2012/040149 dated Jan. 10, 2013, 8 pages).

Laine, S., et al., "Clipless Dual-Space Bounds for Faster Stochastic Rasterization," ACM Transactions on Graphics, vol. 30, No. 4, Article 106, Jul. 2011.

Laine, S., et al., "Improved Dual-Space Bounds for Simultaneous Motion and Defocus Blur, "Technical Report NVR-2011-004, NVIDIA, Nov. 2011.

Wexler, D., et al, "GPU-accelerated high-quality hidden surface removal," The ACM SIGGRAPH/Eurographics Conference on Graphics Hardware, Eurographics Association, 2005.

Search report in corresponding TW application No. 101143670 dated Dec. 29, 2015 (1 page) [no English translation].

Laine, S., et al., "Clipless Dual-Space Bounds for Faster Stochastic Rasterization," ACM Transactions on Graphics, vol. 30, Issue 4, Jul. 2011, (6 pages).

\* cited by examiner

CULLING USING LINEAR BOUNDS FOR STOCHASTIC RASTERIZATION

CROSS-REFERENCE TO RELATED APPLICATIONS

This is a non-provisional application based on provisional application Ser. No. 61/565,614, filed Dec. 1, 2011, hereby expressly incorporated by reference herein.

BACKGROUND

This relates to computing and graphics processing in particular.

Realistic camera effects, such as motion blur and depth of field, rendered with accurate and correct visibility computations, will provide a major leap forward for cinematic image quality for real-time rendering. As a result, the research activity in the field of stochastic rasterization and related techniques has increased substantially over the last few years. This includes more efficient rasterization techniques, occlusion culling, and hardware implementations.

One of the most optimized and power-efficient units in a contemporary graphics processor is the two-dimensional rasterizer implemented in fixed-function hardware. We focus only on the visibility problem of five-dimensional rasterization with the long-term target being a new fixed-function unit.

There are many benefits to using a tile test, which determines whether a block of pixels overlap with a motion-blurred/defocused triangle. Using per-tile bounds for u, v (lens coordinates) and t (time) individually, is very efficient for either motion blur or depth of field, but is considerably less efficient when rendering simultaneous motion blur and depth of field.

BRIEF DESCRIPTION OF THE DRAWINGS

Some embodiments are described with respect to the following figures.

$$u_a(t) = u(0) + t(u(1) - u(0)) \text{ and } u_b(t) = u\left(\frac{1}{2}\right) - \frac{1}{2}\frac{\partial u}{\partial t}\left(\frac{1}{2}\right) + t\frac{1}{2}\frac{\partial u}{\partial t}\left(\frac{1}{2}\right).$$

Figure 2B:
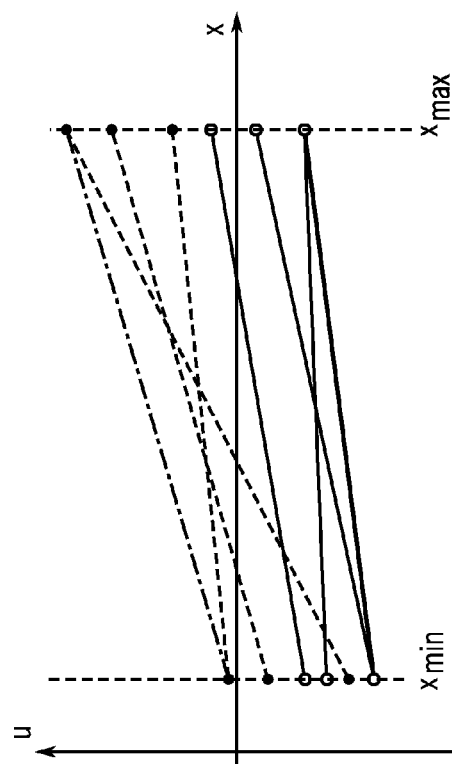
FIG. 2A plots u(x, t) as a rational function in t bounded with an upper and a lower linear segment.

FIG. 2B plots a set of u(x, t) functions as lines in ux space, which are bounded by a lower and upper linear approximation.

Figure 3B:
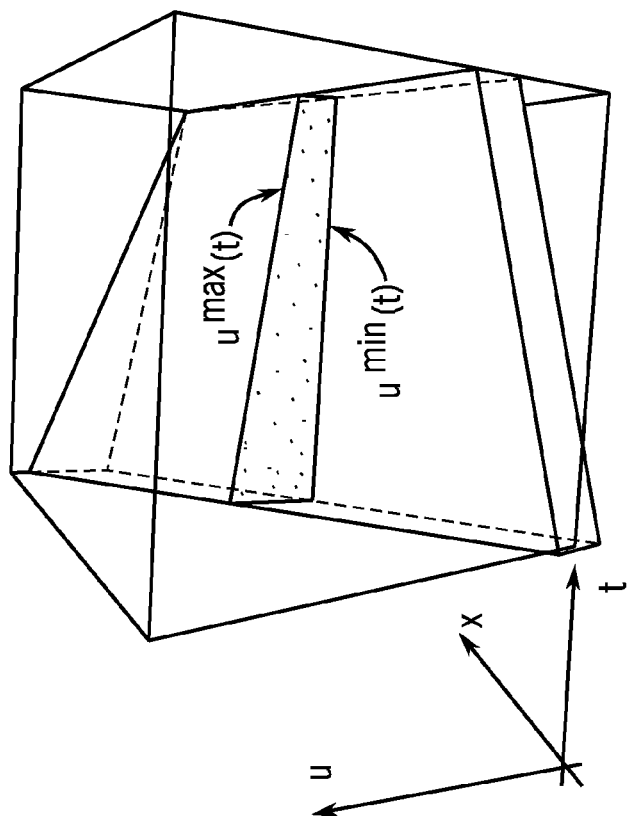
Figure 3A:
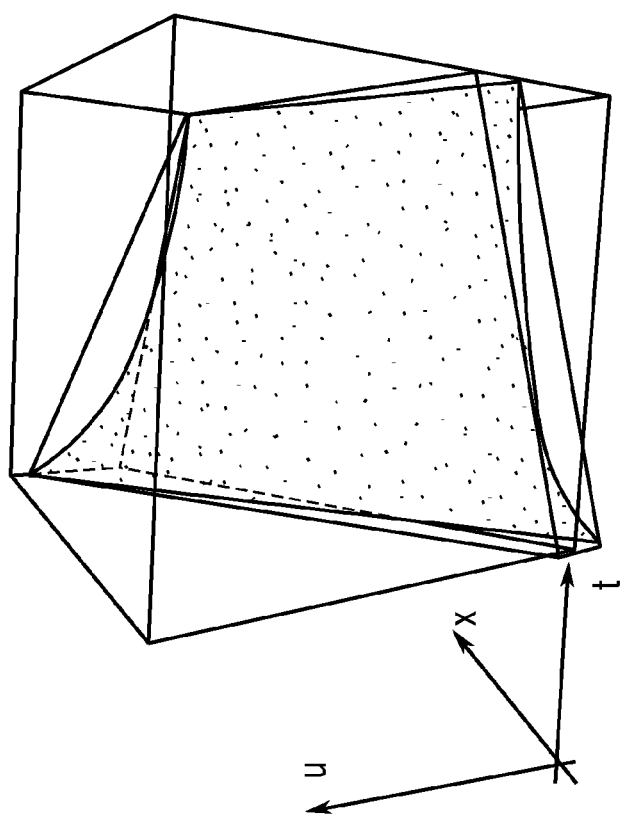

FIG. 3A plots u(x, t) as a rational function in t and linear in x, and bilinear bounds enclosing the function.

FIG. 3B shows that given the bilinear bounds, for a certain screen space position x, we can derive a lower ($u^{min}(t)$) and upper ($u^{max}(t)$) linear bound in ut space.

$$u_a(t) = u(0) + t(u(1) - u(0)) \text{ and } u_b(t) = u\left(\frac{1}{2}\right) - \frac{1}{2}\frac{\partial u}{\partial t}\left(\frac{1}{2}\right) + t\frac{1}{2}\frac{\partial u}{\partial t}\left(\frac{1}{2}\right).$$

Figure 4:
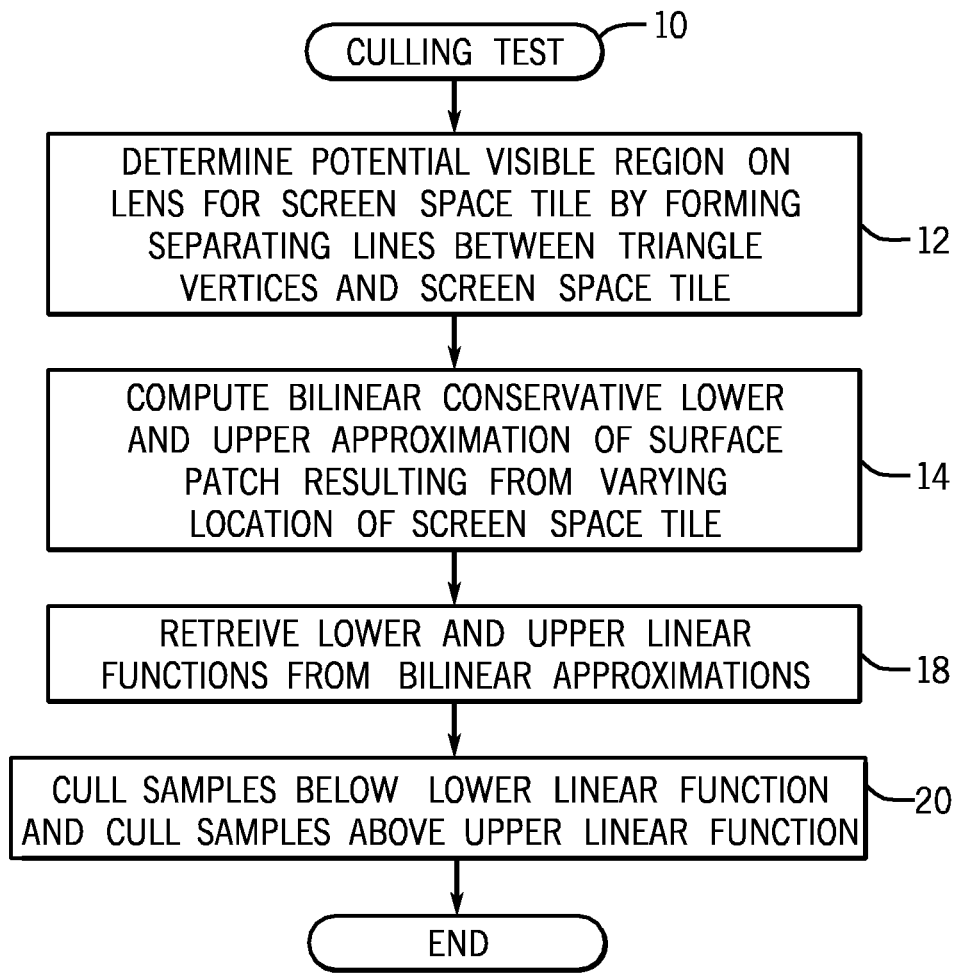
Figure 5:
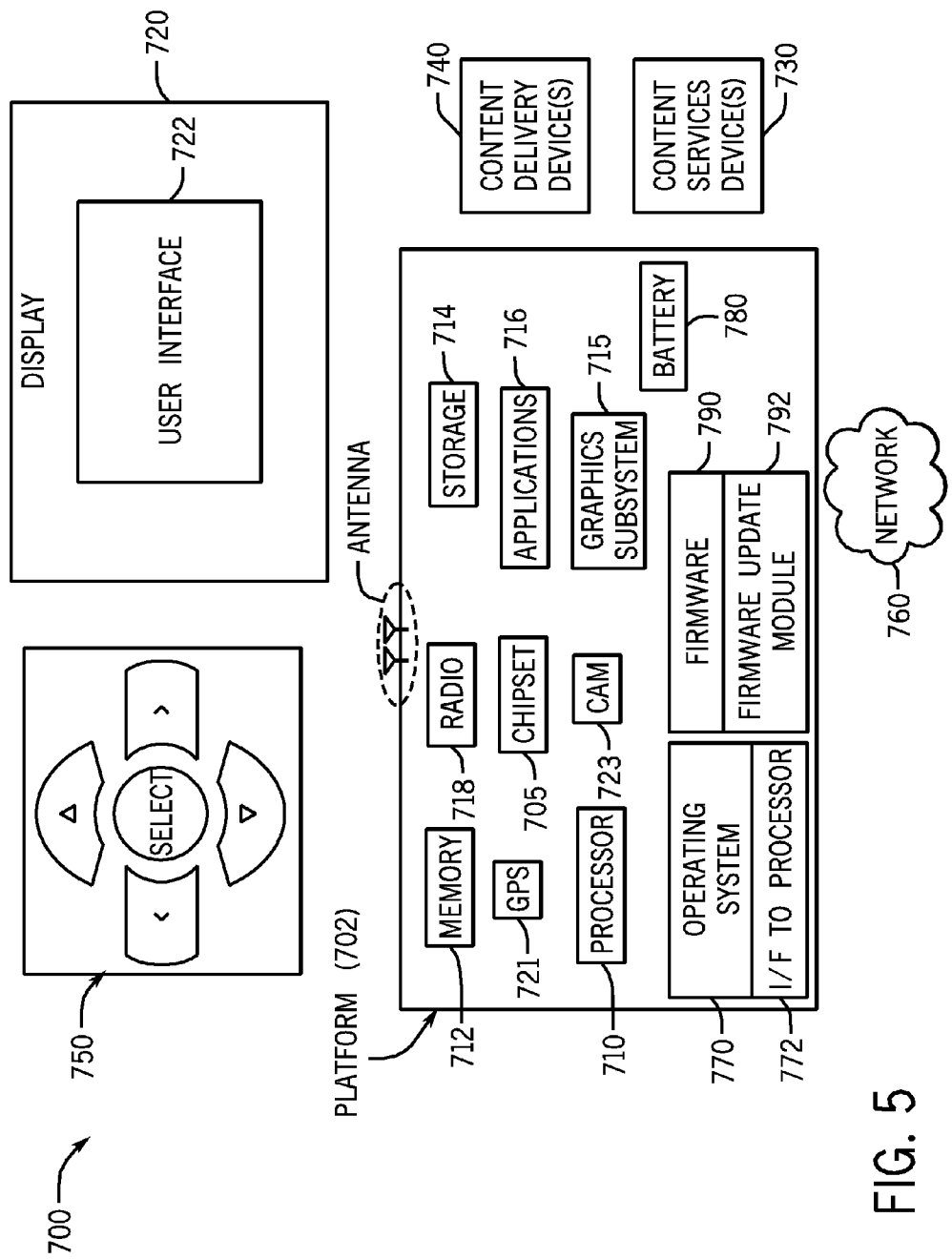

FIG. 4 is a flow chart for a culling test sequence according to one embodiment;

FIG. 5 is a system depiction for one embodiment; and

Figure 6:
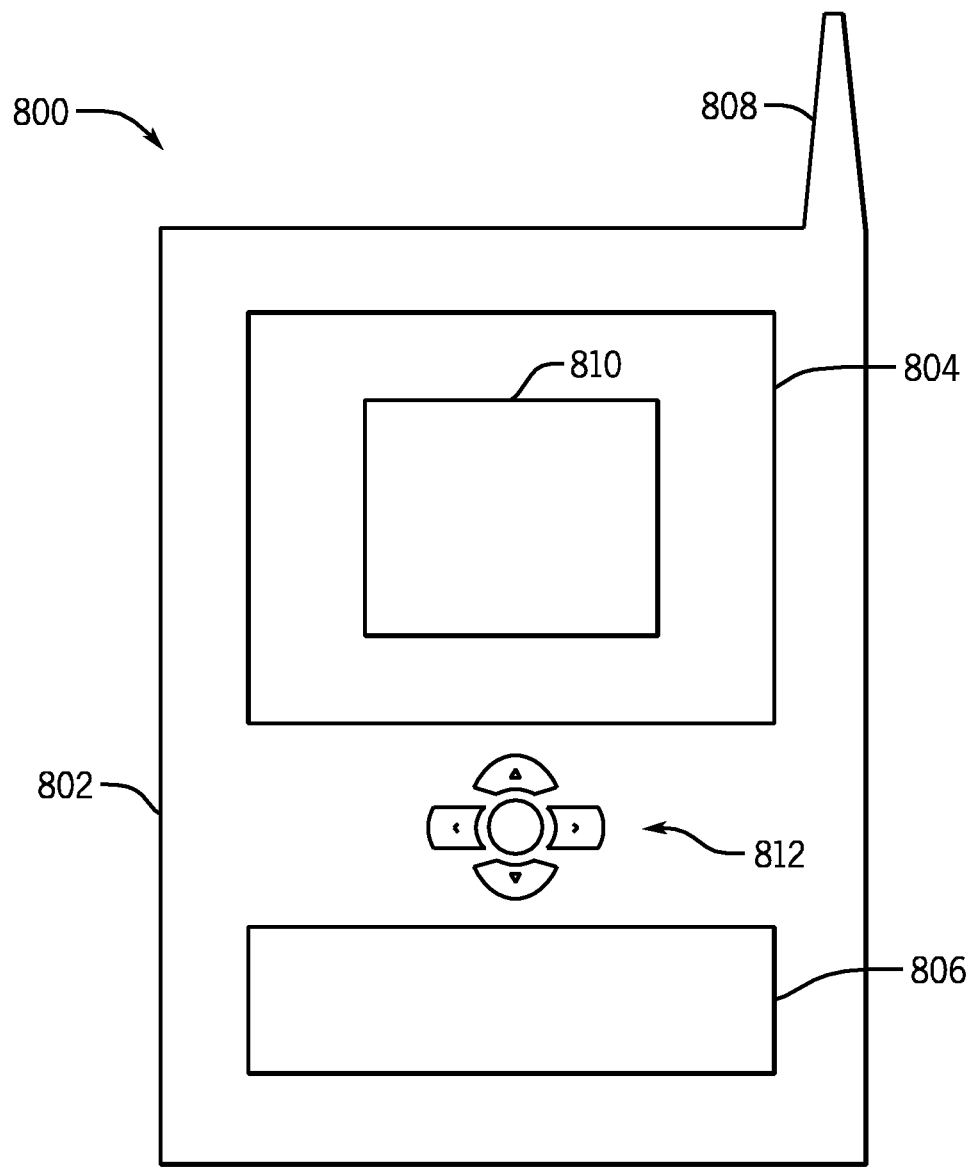

FIG. 6 is a front elevational view of one embodiment.

DETAILED DESCRIPTION

A culling test may be used for stochastic rasterization of simultaneous motion blur and depth of field. A tile is a rectangular block of pixels. An inside test simply computes whether a certain five-dimensional (5D) sample, $(x_i, y_i, u_i, v_i, t_i)$, is inside the triangle being rasterized. In general, the number of unnecessary inside tests is advantageously minimized in some cases.

As usual for depth of field (DOF) rendering, the lens area is parameterized by $(u, v) \in \Omega \subseteq [-1, 1] \times [-1, 1]$, where $\Omega$ is the aperture shape and may, for instance, be hexagonal or circular. In general, we have N samples per pixel for stochastic rasterization, where each sample consists of a spatial position, $(x_i, y_i)$, a lens position, $(u_i, v_i)$ and the sample time $t_i$. A clip-space vertex of a triangle is denoted $(p_x^i, p_y^i, p_w^i)$ and a triangle is then $p^0p^1p^2$. We assume linear vertex motion, so that each vertex moves according to $p^i(t) = (1-t)q^i + tr^i$. We call the plane w=F, where rendered geometry will appear in perfect focus, the focus plane, and the w=0 plane is denoted the camera plane. The signed clip space circle of confusion radius of a moving vertex $p^j(t)$ is a linear function $c_j(t) = (1-t)c_j^0 + tc_j^1$. A separating plane test may be derived between a screen space tile edge and a defocused triangle. Here, we generalize this test to also take motion into account, and use the result to derive linear bounds in ut space. A potential separating line, passing through a moving triangle vertex $p^j(t)$ and a tile corner $(x^i, y^i)$, in screen space, intersects the camera lens at:

$$(u^{ij}(t), v^{ij}(t)) = \left(\frac{n_x^i \cdot p^j(t)}{c_j(t)}, \frac{n_y^i \cdot p^j(t)}{kc_j(t)}\right), \quad (1)$$

where $n_x^i = (-1, 0, x^i)$ and $n_y^i = (0, -1, y^i)$ are the normal vectors for the two tile-frustum planes (planes containing the origin and passing through a tile side), and k>0 is a scalar that compensates for non-square aspect ratios.

Figure 1:
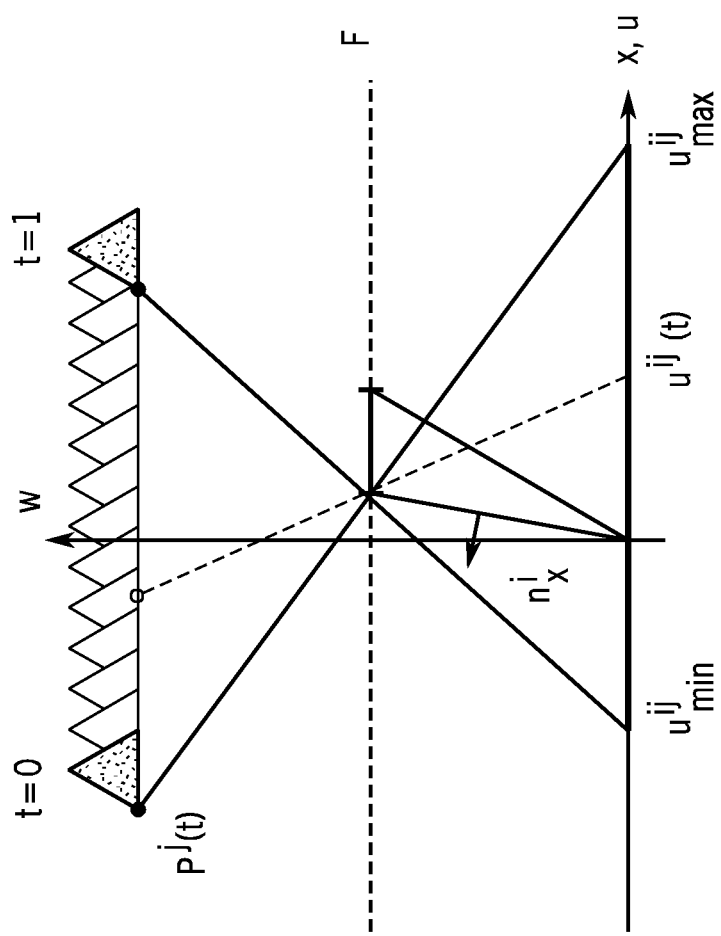
FIG. 1 is a plot of the visible region of a moving triangle, as seen through a screen space tile. The illustration is shown in the w, x plane, where w, represents the vertex depth in clip space, and x is the vertex x coordinate in clip space. The illustrations shows a potential separating line, passing through a moving triangle vertex $p^j(t)$ and a tile corner in screen space, that intersects the camera lens at $u^{ij}(t)$.

FIG. 1 shows a potential separating line, passing through a moving triangle vertex $p^j(t)$ and a tile corner in screen space, intersecting the camera lens at $u^{ij}(t)$. For a given screen space tile, the potential visible interval in the u-dimension (a similar derivation holds for the v-dimension), denoted $\hat{u}(t)$, on the lens for a moving triangle is given by:

$$\hat{u}(t) = \left[\min_{i,j} u^{ij}(t), \max_{i,j} u^{ij}(t)\right]. \quad (2)$$

where i can be either the x-coordinate for the left or right tile side.

FIG. 3 plots u(x, t) as a rational function in t, and linear in x on the left, and the right, given the bilinear bound, shows for a certain screen space position x, deriving a lower ($u^{min}(t)$) and upper ($u^{max}(t)$) linear bound in ut space.

To design an efficient culling test, we search for a conservative lower bound of all six $u^{ij}(t)$ functions. More specifically, we represent this enclosure as a lower bilinear patch $p_u^{min}(x, t)$ as shown in FIG. 3. FIG. 3 shows a rational curve on the left bounded with an upper and a lower linear segment: $u_a(t)=u(0)+t(u(1)-u(0))$ and $$u_b(t) = u\left(\frac{1}{2}\right) - \frac{1}{2}\frac{\partial u}{\partial t}\left(\frac{1}{2}\right) + t\frac{1}{2}\frac{\partial u}{\partial t}\left(\frac{1}{2}\right)$$

and on the right shows a set of linear curves are bounded by a lower and upper linear approximation.

The derivation of a patch is described below. If the triangle intersects the w=F plane, the culling test is disabled for this triangle.

For a given screen space tile $T^i$, we retrieve a linear function $u_i^{min}=k_it+m_i$ from the bilinear representation, below which we can cull all samples. The upper linear bound is derived similarly and gives a second line above which we can cull all samples. Applying the same technique to $v^{ij}(t)$ in Equation (1), we can derive two bounding lines in vt space.

For each tile we evaluate the bilinear patches $p_u^{min}(x, t)$ and $p_u^{max}(x, t)$ at the tile center at a cost of 4 fused multiply-add (FMA) operations to find two bounding lines in ut space. Axis-aligned bounds for u are then obtained by a MIN and a MAX operation. The total cost per tile for bounds in ut and vt is then 8 FMA operations.

We test each sample $(x_k, y_k, u_k, v_k, t_k)$ within the tile against the linear bounds in ut on the form $u(t)=kt+m$ where each test is on the form $u_k<kt_k+m$. Each test is evaluated by a FMA and a MIN operation, and there are four such tests ($u^{min}(t)$, $u^{max}(t)$, $v^{min}(t)$ and $v^{max}(t)$). The four test can be evaluated in fixed-point arithmetic.

The test can also be applied hierarchically if working on blurred tessellated patches. First, enclose the moving patch with an axis aligned bounding box (AABB) enclosing the patch at all times. Then we can derive $u^{ij}(t)$ curves for the moving corners of the AABB, and bound them using the same approach as above, to avoid executing a tile test for each individual triangle of the patch.

The derivation of a patch may be as follows in one embodiment. In FIG. 3, we visualize one $u^{ij}(t)$ function for varying x, as a surface:

$$u^j(x, t) = \frac{n_x \cdot p^j(t)}{c_j(t)} = \frac{-p_x^j(t) + xp_w^j(t)}{c_j(t)} \quad (3)$$

Figure 2A:
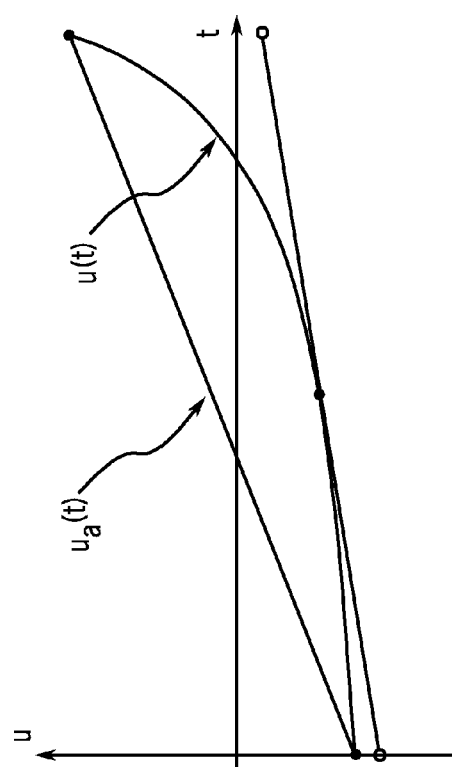

We want to bound this surface from below by a bilinear patch. To derive the bilinear patch, we exploit two properties of Equation (3):
1. $u^j(x, t)$ is linear in x.
2. For a given x, $u^j(x, t)$ is a rational function in t, and if $p_w^j(t) \neq F$, $\forall t \in [0, 1]$, the rational function is continuous and can be bounded by two linear functions $u_a(t)$ and $u_b(t)$, as shown in FIG. 2, depicting $u^{ij}$ projections as a function of time, where FIG. 3B shows the min/max of the projections as a function of time.

The bilinear patch must be conservative for all $t \in [t_0, t_1] \subseteq [0, 1]$ and within the screen space horizontal extents $[x_0, x_1] \subseteq [-1, 1]$ of the moving and defocused triangle. To find a lower bilinear bounds, we proceed as follows:

First, fix $x=x_0$ and evaluate $\min(u_a(t), u_b(t))$, the upper and lower linear bounds for the rational function $u^j(x_0, t)$, at $t=t_0$ and $t=t_1$. Repeat the procedure for $x=x_1$. This gives us four points $c_{x_0,t_0}^j$, $c_{x_1,t_0}^j$, $c_{x_1,t_0}^j$ and $c_{x_1,t_1}^j$ that define a bilinear patch bounding $u^j(x, t)$ over $[x_0, x_1] \times [t_0, t_1]$.

The procedure is repeated for all three $u^j(x, t)$ surfaces, and at each corner, we keep the minimum value, e.g. $c_{x_0,t_0} = \min_j(c_{x_0,t_0}^j)$. The four points define a bilinear patch that is a lower conservative bounds of all three $u_j(x, t)$ functions. The points can be computed in the triangle setup.

During rendering, for a given screen space tile we evaluate the x-coordinate of the bilinear patch at the tile center, to retrieve a linear function $u^{min}(t)=kt+m$. By construction, $u^{min}(t)$ is guaranteed to be lower than all six $u^{ij}(t)$ functions for that tile, so all samples below this line can be safely culled. Using the same procedure, we derive an upper linear bound, and bounds for $v^{ij}(t)$.

Referring to FIG. 4, a sequence 10 may be implemented in software, firmware and/or hardware. In software and firmware embodiments it may be implemented by computer executed instructions stored in one or more non-transitory computer readable media such as magnetic, optical or semiconductor storages.

The sequence shown in FIG. 4 begins by determining a potential visible region on a lens for a given screen space tile as indicated in block 12. For example this may be done by forming separating lines between the triangle vertices and the screen space tile as shown for example in FIG. 1.

For a moving triangle, these separating lines move in time. Therefore we search for a lower linear bound on the lens u coordinate on the form $u=kt+m$. If we also vary the location of the screen space tile, the separating line sweeps out a surface patch $u(x, t)$ as shown in FIG. 3A.

Then we compute a bilinear conservative lower (and upper) approximation of this surface patch in the triangle set-up stage of the rasterizer as indicated in block 14. For a given screen space tile, with center at x, we can then retrieve a lower (and upper) linear function $u(t)=kt+m$ from the binary linear proximation, as shown in FIG. 3B and as indicated in block 18. Finally all samples with (u, t) values below the lower linear function and samples above the upper linear function can be culled as indicated in block 20.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequence shown in FIG. 4 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be a method using a processor to form separating lines between moving triangle vertices and a screen space tile and using said separating lines in ut-space and vt-space to cull samples for graphics processing. The method may also include using the separating lines to determine a potential visible region on a lens for the screen space tile. The method may also include computing a bilinear conservative approximation of a surface patch resulting from varying a location of the screen space tile. The method may also include varying the location of the screen space tile so a separating line sweeps out an upper and lower bilinear surface patch. The method may also include computing lower and upper approximations of the surface patches. The method may also include retrieving linear functions from said bilinear patches. The method may also include retrieving lower and upper linear functions. The method may also include culling samples below or above said linear functions. The method may also include culling for stochastic rasterization. The method may also include extracting both defocus and motion blur for simultaneous motion blur and depth of field. The method may also include minimizing the number of visibility tests for rasterization. The method may also include using a hierarchical culling test on blurred tessellated patches. At least one machine readable medium comprising a plurality of instructions and, in response to being executed on a computing device, causing the computing device to carry out a method according to any one of claims 1-12.

One example embodiment may be an apparatus to include: a processor to form separating lines between moving triangle vertices and a screen space tile and use said separating lines in ut-space and vt-space to cull samples for graphics processing and a memory coupled to said processor. One example embodiment may be an operating system, battery, firmware and a module to update said firmware, wherein using separating lines to determine a potential visible region on a lens for the screen space tile, wherein said processor to compute a bilinear conservative approximation of a surface patch resulting from varying a location of the screen space tile, wherein said processor to vary the location of the screen space tile so a separating line sweeps out an upper and lower bilinear surface patch, wherein said processor to compute lower and upper approximations of the surface patches, wherein said processor to retrieve linear functions from said bilinear patches, wherein said processor to retrieve lower and upper linear functions, wherein said processor to cull samples below or above said linear functions, wherein said processor to cull for stochastic rasterization, wherein said processor to extract both defocus and motion blur for simultaneous motion blur and depth of field.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
using a processor to form separating lines between moving triangle vertices and a screen space tile;

using said separating lines in ut-space and vt-space to cull samples for graphics processing; and performing, in a processor, stochastic rasterization of simultaneous motion blur and depth of field using samples that were not culled.

2. The method of claim 1 including using the separating lines to determine a potential visible region on a lens for the screen space tile.

3. The method of claim 2 including computing a bilinear conservative approximation of a surface patch resulting from varying a location of the screen space tile.

4. The method of claim 3 including computing lower and upper approximations of the surface patches.

5. The method of claim 4 including retrieving linear functions from said bilinear patches.

6. The method of claim 5 including retrieving lower and upper linear functions.

7. The method of claim 6 including culling samples below or above said linear functions.

8. The method of claim 1 including culling for stochastic rasterization.

9. The method of claim 8 including extracting both defocus and motion blur for simultaneous motion blur and depth of field.

10. The method of claim 9 including minimizing the number of visibility tests for rasterization.

11. The method of claim 10 including using a hierarchical culling test on blurred tessellated patches.

12. At least one non-transitory machine readable medium comprising a plurality of instructions and, in response to being executed on a computing device, causing the computing device to carry out a method comprising:

using a processor to form separating lines between moving triangle vertices and a screen space tile;

using said separating lines in ut-space and vt-space to cull samples for graphics processing; and performing, in a processor, stochastic rasterization of simultaneous motion blur and depth of field using samples that were not culled.

13. An apparatus comprising:

a processor to form separating lines between moving triangle vertices and a screen space tile, use said separating lines in ut-space and vt-space to cull samples for graphics processing, and perform, in a processor, stochastic rasterization of simultaneous motion blur and depth of field using samples that were not culled; and a memory coupled to said processor.

14. The apparatus of claim 13 including an operating system.

15. The apparatus of claim 13 including a battery.

16. The apparatus of claim 13 including firmware and a module to update said firmware.

17. The apparatus of claim 13, said processor to use the separating lines to determine a potential visible region on a lens for the screen space tile.

18. The apparatus of claim 17, said processor to compute a bilinear conservative approximation of a surface patch resulting from varying a location of the screen space tile.

19. The apparatus of claim 18, said processor to compute lower and upper approximations of the surface patches.

20. The apparatus of claim 19, said processor to retrieve linear functions from said bilinear patches.

21. The apparatus of claim 20, said processor to retrieve lower and upper linear functions.

22. The apparatus of claim 21, said processor to cull samples below or above said linear functions.

23. The apparatus of claim 13, said processor to cull for stochastic rasterization.

24. The apparatus of claim 23, said processor to extract both defocus and motion blur for simultaneous motion blur and depth of field.

25. The medium of claim 12, further storing instructions to carry out said method including using the separating lines to determine a potential visible region on a lens for the screen space tile.

26. The medium of claim 25, further storing instructions to carry out said method including computing bilinear conservative approximation of a surface patch resulting from varying a location of the screen space tile.

27. The medium of claim 26, further storing instructions to carry out said method including computing lower and upper approximations of the surface patches.

28. The medium of claim 27, further storing instructions to carry out said method including retrieving linear functions from said bilinear patches.

29. The medium of claim 28, further storing instructions to carry out said method including retrieving lower and upper linear functions.

30. The medium of claim 29, further storing instructions to carry out said method including culling samples below or above said linear functions.

* * * * *